No. 769,823. PATENTED SEPT. 13, 1904.
S. GREENFELD.
COOKING IMPLEMENT.
APPLICATION FILED NOV. 16, 1903.
NO MODEL.
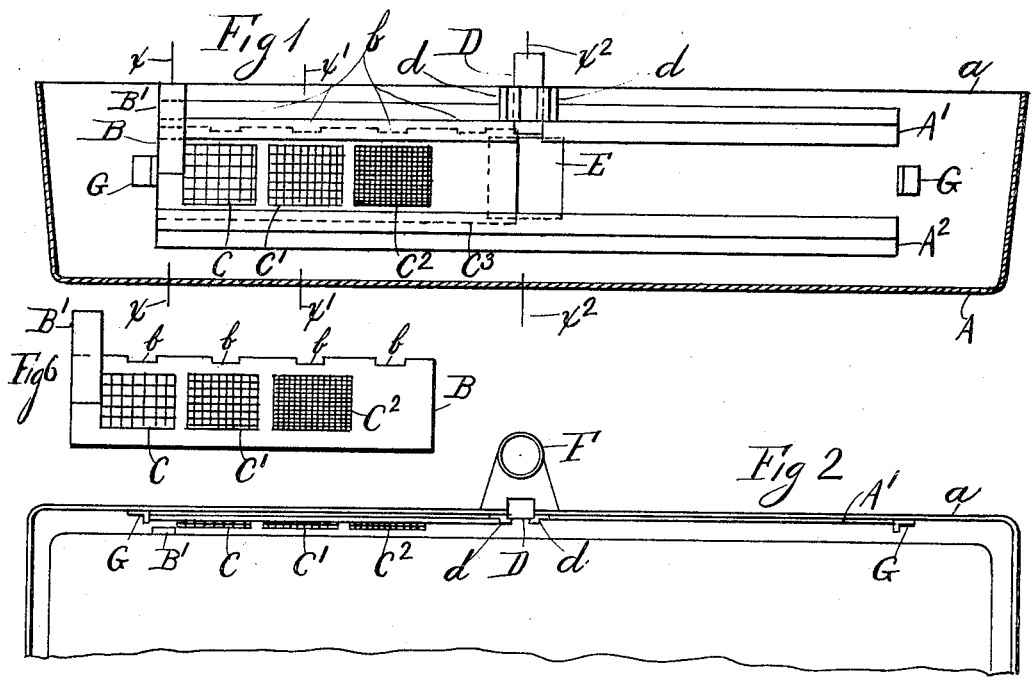
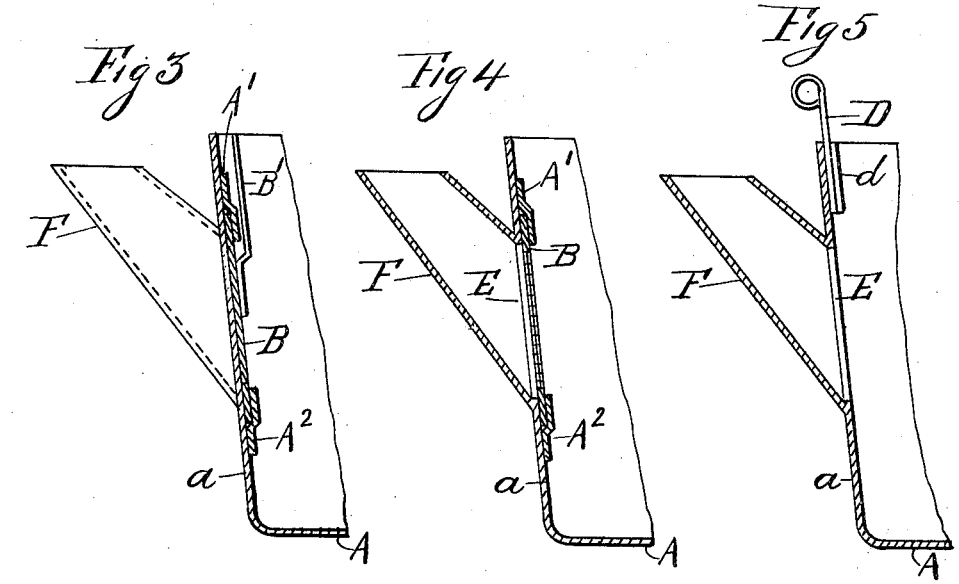
Witnesses
W. E. de Bonneville
M. Hubbe
Inventor
Samuel Greenfeld
By his Attorney
A. de Bonneville No. 769,823. Patented September 13, 1904.

UNITED STATES PATENT OFFICE.

SAMUEL GREENFELD, OF BROOKLYN, NEW YORK.

COOKING IMPLEMENT.

SPECIFICATION forming part of Letters Patent No. 769,823, dated September 13, 1904.

Application filed November 16, 1903. Serial No. 181,358. (No model.)

*To all whom it may concern:*

Be it known that I, SAMUEL GREENFELD, a citizen of the United States, and a resident of the borough of Brooklyn, in the county of Kings and State of New York, have invented a certain new and useful Cooking Implement, of which the following is a specification.

This invention relates to adjustable screens for cooking implements or utensils, roasting-pans, and the like. Its object is to produce a pan and the like with a screen having strainers of various mesh.

Referring to the drawings, Figure 1 represents an axial vertical cross-section of a cooking utensil or pan with the invention attached thereto. Fig. 2 shows a partial top view of Fig. 1. Fig. 3 is a partial section of Fig. 1 on the line $x\,x$. Fig. 4 represents a partial section of Fig. 1 on the line $x'\,x'$, and Fig. 5 shows a partial section of Fig. 1 on the line $x^2\,x^2$. Fig. 6 represents a front view of the slide with its strainers.

The pan is represented at A, on one of the sides $a$ of which are fastened the guides $A'\,A^2$ for a slide B, which latter has openings covered with the strainers or screens $C\,C'\,C^2$ and a handle $B'$. The upper guide $A'$ has an opening in about its central portion for a secondary slide or catch D. The latter is held between secondary guides $d$, attached to the side $a$ of the pan.

The slide B has on its upper edge the notches or indentations $b$, suitable to be engaged by the secondary slide D. An opening E is formed in the side $a$ of the pan and is arranged so that the slide B can be made to cover the said opening E, and the end $C^3$ of the said slide is not perforated, as shown. A spout F extends from the opening E in the pan, and stops G are fastened to the side $a$ to prevent the slide B becoming disengaged from the guides $A'\,A^2$.

To use the invention, the secondary slide D is made to engage with any of the notches $b$, thereby closing the opening E or bringing the screens C to $C^2$ over the opening, or the said opening can be left uncovered, as shown in Fig. 1.

It is evident that my invention can be applied to a cylindrical or curved vessel, the guides and slide being made to conform to the shape of the vessel.

In using the invention the slide is generally made to cover the opening in the side of the pan with one of the strainers suitable to the thickness of the gravy in the pan. The latter is then tipped, and the gravy is strained through the strainer before it runs from the spout.

Having described my invention, I claim—

1. A cooking utensil provided with an opening in a side or wall thereof, in combination with a slide arranged to be placed over said opening, strainers on the slide, a secondary slide on the utensil arranged to engage the first slide, and retain the latter in position.

2. A cooking utensil provided with an opening in a side or wall thereof, in combination with a slide arranged to be adjusted over said opening, strainers over openings in the slide, the said slide having notches in one edge thereof, a secondary slide on the utensil arranged to engage said notches, and a spout extending from the opening in the utensil.

3. A cooking-pan provided with an opening in a side or wall thereof, in combination with a slide having notches in one of its edges, and arranged to be adjusted over said opening, guides on the side of the pan and extending on two sides of said opening, secondary guides extending from the first set of guides, a secondary slide arranged in the secondary guides, strainers over openings in the first slide, the secondary slide arranged to engage the notches in the first slide, and a spout extending from the opening in the side of the pan.

Signed at New York, in the county of New York and State of New York, this 19th day of October, A. D. 1903.

SAMUEL GREENFELD.

Witnesses:
NEWTON HARRISON,
GEO. R. YOUNG.